United States Patent [19]

Fischer

[11] Patent Number: 4,964,476
[45] Date of Patent: Oct. 23, 1990

[54] DRILLING DEVICE FOR PRODUCING DRILL HOLES WITH AN UNDERCUT

[75] Inventor: Artur Fischer, Tumlingen, Fed. Rep. of Germany

[73] Assignee: fischerwerke Artur Fischer GmbH & Co. KG, Waldachtal/Tumlingen, Fed. Rep. of Germany

[21] Appl. No.: 421,527

[22] Filed: Oct. 13, 1989

[30] Foreign Application Priority Data

Oct. 14, 1988 [DE] Fed. Rep. of Germany ....... 3835025

[51] Int. Cl.⁵ .............................................. E21B 10/26
[52] U.S. Cl. ...................................... 175/213; 408/69
[58] Field of Search .................... 175/213, 313; 408/69

[56] References Cited

U.S. PATENT DOCUMENTS

| | | | |
|---|---|---|---|
| 2,919,901 | 1/1960 | Sandvig | 175/213 X |
| 3,022,840 | 2/1962 | Hohes et al. | 175/213 X |
| 3,442,337 | 5/1969 | Astrom | 175/213 X |
| 3,850,254 | 11/1974 | Hirdes | 175/75 |
| 3,948,330 | 4/1976 | Langford, Jr. | 175/339 |
| 4,097,176 | 6/1978 | Wanner et al. | 175/213 X |

FOREIGN PATENT DOCUMENTS

| | | |
|---|---|---|
| 2723785 | 11/1978 | Fed. Rep. of Germany . |
| 2948682 | 6/1981 | Fed. Rep. of Germany . |
| 3014388 | 10/1981 | Fed. Rep. of Germany . |
| 3340090 | 5/1985 | Fed. Rep. of Germany . |
| 3620389 | 10/1987 | Fed. Rep. of Germany . |

*Primary Examiner*—William P. Neuder
*Attorney, Agent, or Firm*—Michael J. Striker

[57] ABSTRACT

A drilling device for producing drill holes with undercuts and comprising a drill bit, a drill bit holder for receiving the drill bit and having a suction chamber, and a suction bell surrounding the drill bit holder and communicating with the suction chamber therein, the stem of the drill bit having a continuous axial bore communicating with the suction chamber and a plurality of slots arranged in a region of a cross-sectional enlargement of the stem.

7 Claims, 2 Drawing Sheets

Fig. 4
Fig. 5
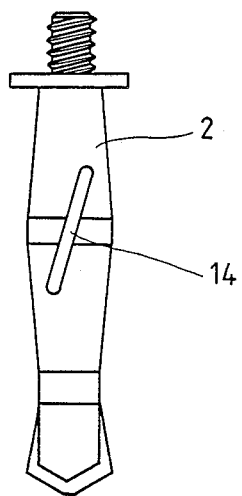
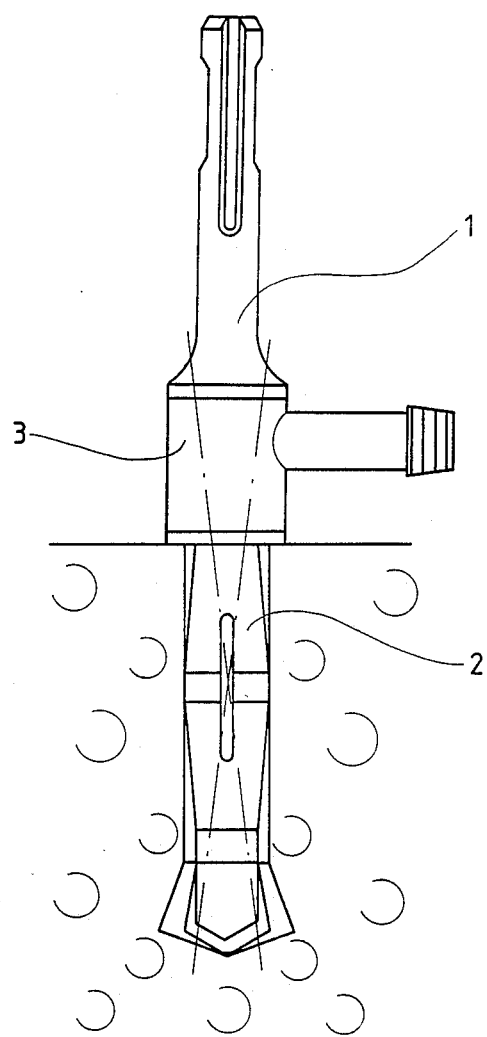

DRILLING DEVICE FOR PRODUCING DRILL HOLES WITH AN UNDERCUT

BACKGROUND OF THE INVENTION

The invention relates to a drilling device for producing drill holes with an undercut and comprising a drill bit attached to a drill bit holder and a suction bell.

German Offenlegungsschrift 33 40 090 discloses a drilling device of the type mentioned in which a drill bit can be screwed into a drill bit holder. A suction bell is provided in the region of the drill bit holder. The suction bell surrounds the drill bit holder and the drill bit stem. The suction bell is attached with a suction hose to a suction fan of a drilling machine or similar apparatus. The purpose of the suction device is to suck off the drilling dust accumulating in the drill hole during the drilling operation. In this known device, the drill bit stem is guided with a lateral play in a suction sleeve so that the drill bit is pivotable within the suction sleeve. The pivotal movement enables to produce the undercut at the bottom of the drill hole.

Metal expansible fixing plugs can be inserted in a drill hole with an undercut. They expand in the region of the undercut and are, thus, anchored positively in the drill hole.

To produce an undercut at the bottom of the drill hole that is as accurate as possible, the pivotal movement of the drill bit has to be limited. This can be achieved by providing in the middle of the drill bit stem a cross-sectional enlargement which serves as a pivot bearing that engages the wall of the drill hole. The cross-sectional enlargement, however, makes it difficult to suck off the drilling dust, since there is only a small gap left clear in the region of the cross-sectional enlargement for sucking the drilling dust away.

SUMMARY OF THE INVENTION

The object of the invention is to provide a drilling device for producing drill holes with an undercut and having a suction device which is of a simple construction and permits the drilling dust to be sucked away at the drill bit tip. The object of the invention is achieved by providing in the drill bit stem a continuous axial bore which opens into a suction chamber of the drill bit holder, and slots in the region of the cross-sectional enlargement of the drill bit stem. The continuous axial bore enables the drilling dust to be sucked away directly at the drill bit tip. The slots permit the volume of air sucked away to flow back. The slots additionally have the advantage that they prevent the drill stem from jamming in the drill hole. When the drilling device is provided with a smooth drill bit stem and a drill bit stem enlargement, which corresponds approximately to the diameter of the drill head, the drill bit frequently jams, as test drillings have shown.

The drill bit preferably has a thread end portion with which it is screwed into the drill bit holder having a suction chamber surrounded by a tubular suction bell. The suction bell preferably includes a tube portion with a laterally projecting suction nozzle to which a suction hose of a suction pump can be attached in a manner known per se. The tube portion of the suction bell is held in a very simple manner between two flanges provided, respectively, on the drill bit holder and on the drill bit stem. The flange formed on the drill bit stem serves, at the same time, as a stop that determine the maximum depth of the drill hole.

The slots formed on the drill bit stem, are about 1 to 2 cm long and, preferably, have a pitch such that they convey the drilling dust accumulating in this region towards the drill head. The pitch of the slots may, alternatively, however, be such that the slots alternate opposite to each other or are of the same shape, as in the case of drilling dust grooves, if this is required for special applications. The slots serve both as air inlet channels and also for further transport of the drilling dust accumulating in this region.

To mount the drill plate in the drill head in an optimum manner, it is advantageous to extend the continuous bore laterally past the drill plate at a distance therefrom. The drill plate can thus be inserted in a groove provided in the solid part of the drill head.

It is especially advantageous to branch the continuous bore in the region of the drill head, so that on each side of the drill plate a branch of the continuous bore leads to a suction opening. This can also be regarded as a forking of the continuous bore. The two suction openings obtained thereby permit the accumulated drilling dust to be sucked away directly on both sides of the drill plate.

The present invention both as to its construction so to its mode of operation, together with additional objects and advantages thereof, will be best understood from the following description of the preferred embodiment with reference to the accompanying drawings.

BRIEF DESCRIPTION OF THE DRAWINGS

FIG. 4 shows a view similar to that of FIG. 1b but with a dust removing slot extending at acute angle to a longitudinal axis of the drill bit; and FIG. 5 shows a general elevation view of the drilling device according to the invention.

DESCRIPTION OF THE PREFERRED EMBODIMENT

Figure 1A:
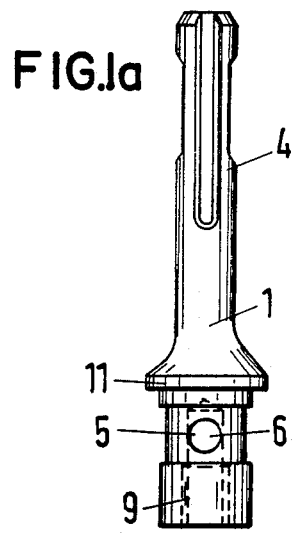
FIG. 1a shows an elevation view of a drill bit holder of a drilling device according to the invention.

The drilling device of the present invention comprises a drill bit holder 1, a drill bit 2, and a suction bell 3. The drill bit holder 1 has a mounting shank 4 with which it can be clamped in a drill chuck or similar part of a drilling machine. In addition, the drill bit holder 1 has a suction chamber 5 onto which the suction bell 3 can be pushed from beneath. An opening 6 connects the suction chamber 5 with the inner chamber 7 of the suction bell 3.

Figure 2:
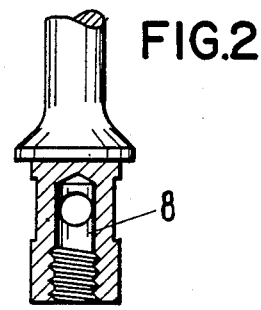
FIG. 2 shows a partial cross-sectional view of the drill bit holder shown in FIG. 1.

A bore 8 which is provided at the lower end of the drill bit holder 1 and forms the suction chamber, has an internal thread 9 shown in FIG. 2.

The drill bit 2 has a threaded end portion 10 with which it can be screwed into the internal thread 9. Prior to this, however, the suction bell 3 is pushed over the suction chamber 5. A flange 11 formed on the drill bit holder 1, and a flange 12 formed on the drill bit 2, close the suction bell 3 at its two end faces.

The drill bit 2 comprises a smooth stem 13 provided with slots 14 distributed around its periphery. The slots 14 are located in a region where the cross-section of the stem is greatest, and serve as external air channels and as reaming elements which prevent the drill bit from becoming jammed in the drill hole. The slots 14 could also be arranged to extend at an acute angle relative to the longitudinal axis of the drill bit as shown in FIG. 4. The slots may have a pitch corresponding to the pitch drilling dust grooves. The grooves can, however, also have a pitch such that the drilling dust accumulating in this region, is conveyed in the direction of the drill head 15.

The drill bit 2 has a continuous axial bore 16 shown in the drawing by broken lines. The continuous bore 16 has its smallest diameter in the region of the drill head 15 and adjacent to the drill head region, where the diameter of the stem is smallest. In the region where the cross-section of the stem widens, the continuous bore 16 likewise has a larger diameter, whereby a considerable improvement in the suction of the drilling dust is achieved. The suction chamber 5 has a diameter larger than the larger diameter of the bore 16, and opens into the suction bell 3 by means of openings 6. Thus, the suction bore has a flow cross-section that increases continuously from the drill head tip. This results in optimum suction of the drilling dust.

The suction bell 3 has a laterally projecting suction nozzle 17 to which a suction hose (not shown) of a suction pump can be attached in a manner known per se.

Lateral cutting edges 18, 19 of a drill plate 20 which project laterally from the drill head 15, serve to produce an undercut in a drill hole. The maximum drill head diameter is determined by the lateral cutting edges 18, 19. The maximum drill head diameter is only slightly larger than the maximum cross-sectional enlargement in the region 21 of the drill stem. The cross-sectional enlargement of the drill stem serves as a pivot bearing, which provides for a predetermined swinging of the drill head 15 at the bottom of the drill hole to form an undercut. As it can be seen in FIG. 5, the tapering surface extending from the cross-sectional enlargement of the bit stem limits (defines) the size of the undercut. The enlarged region 21 engages the drill hole wall during this operation.

Figures 3A, 3B:
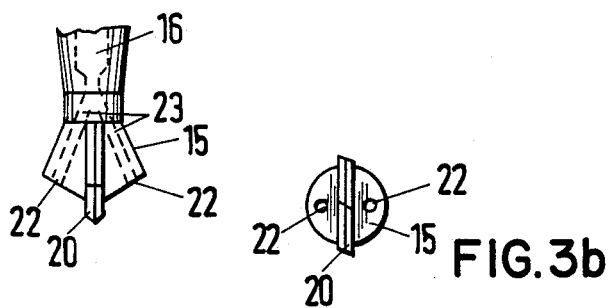
FIG. 3a shows a partial elevation view of the drill bit with a branched or forked continuous bore.
FIG. 3b shows a bottom view of the drill bit.

FIG. 3a shows the drill bit 2 in the region of the drill head 15. The continuous bore 16 forks and extends to suction openings 22 formed on both sides of the drill plate 20 mounted at the front end of the drill head 15. For this purpose, inside the drill head 15, straight channels 23 are formed. The channels converge in the drill stem.

Figure 1B:
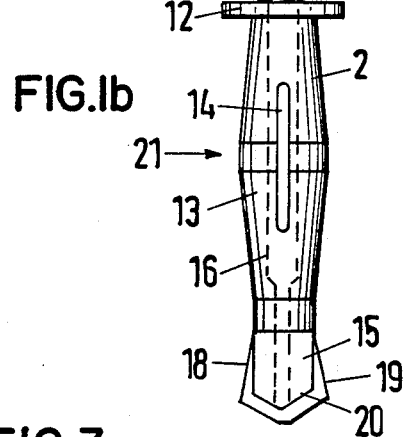
FIG. 1b shows an elevation view of a drill bit of a drilling device according to the invention.
Figure 1C:
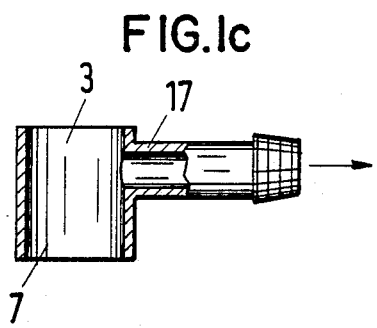
FIG. 1c shows a partially cross-sectional view of a suction bell of a drilling device according to the invention.

The drill head 15 shown in FIG. 3, flares conically. However, it is also possible to form the drill head as a straight shank part, as shown in FIG. 1. In the case of the conically flared drill head, it is possible, however, to provide larger suction openings 22 than in a straight drill head of a smaller diameter.

While the invention has been illustrated and described as embodied in a drilling device for producing drill holes, with an undercut, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A drilling device for producing drill holes with an undercut, comprising a drill bit having a stem, a drill head arranged at an end of said stem, and a drill plate projecting from said drill head; a drill bit holder for receiving said drill bit and having a suction chamber; and a suction bell surrounding said drill bit holder and communicating with said suction chamber, said drill bit stem having a continuous axial bore communicating with said suction chamber, a cross-section enlargement for pivotally supporting said drill bit during forming an undercut, a tapering surface extending from said cross-sectional enlargement for limiting a size of the undercut, and a plurality of slots provided on said stem in a region of said cross-sectional enlargement.

2. A drilling device according to claim 1, wherein said slots extend at an acute angle to a longitudinal axis of said drill bit.

3. A drilling device according to claim 1, wherein said drill bit holder and said drill bit stem have opposite flanges, and said suction bell comprises a tube and a laterally projecting suction nozzle, said tube portion being mounted between said opposite flanges.

4. A drilling device according to claim 1, wherein said continuous bore has a small diameter in a region of the drill bit head and a larger diameter inside the drill bit stem.

5. A drilling device according to claim 1, wherein said drill bit has an end remote from the drill head and having a threaded portion which is screwed into said drill bit holder.

6. A drilling device according to claim 1, wherein said continuous bore extends laterally past said drill plate.

7. A drilling device according to claim 1, wherein said continuous bore forks in the region of said drill head and extends to suction openings on both sides of said drill plate.

* * * * *